United States Patent [19]

Suhoza

[11] Patent Number: 5,216,056
[45] Date of Patent: Jun. 1, 1993

[54] COLOR STABILIZATION OF FILLED POLYOLEFINS

[75] Inventor: Richard A. Suhoza, Norwalk, Conn.

[73] Assignee: R. T. Vanderbilt Company, Inc., Norwalk, Conn.

[21] Appl. No.: 859,788

[22] Filed: Mar. 30, 1992

[51] Int. Cl.$^5$ ............................................. C08K 5/39
[52] U.S. Cl. ................................... 524/202; 524/203; 524/399; 524/451
[58] Field of Search ............... 524/202, 203, 303, 304, 524/451, 399

[56] References Cited

U.S. PATENT DOCUMENTS

| | | | |
|---|---|---|---|
| 3,001,969 | 9/1961 | Tholstrup et al. | 260/45.75 |
| 3,218,275 | 11/1965 | Geigle | 260/23 |
| 3,496,128 | 2/1970 | Casey et al. | 524/202 |
| 3,553,158 | 1/1971 | Gilfillan | 260/41 |
| 4,255,303 | 3/1981 | Keogh | 260/23 |

FOREIGN PATENT DOCUMENTS 792828 4/1958 United Kingdom .
0929435 6/1963 United Kingdom .

OTHER PUBLICATIONS

Hancock: "Fillers for Polypropylene" European Plastics News May 1977 41-43.
Seymour—*Additives for Plastics*-vol. 1 *State of the Art,* 51-77 (1978).

Primary Examiner—Veronica P. Hoke
Attorney, Agent, or Firm—Rasma B. Balodis

[57] ABSTRACT

The invention relates to silicate mineral filled polyolefin compositions which are stabilized against color deterioration during processing by incorporating therein a synergistic color stabilizer composition consisting of zinc dibutylidthiocarbamate and zinc stearate in critical ratios.

7 Claims, No Drawings

COLOR STABILIZATION OF FILLED POLYOLEFINS

BACKGROUND OF THE INVENTION

The present invention concerns stabilization against color deterioration of filled polyolefin compsoitions during processing. More particularly, the invention relates to reduction of discoloration during processing of polyolefins compositions caused by incorporation of mineral fillers into the polyolefin.

It is a common practice to use fillers in polyolefin compositions. The fillers are used to reduce cost and to impart or enhance a desired property in the finished product required in certain fields of application. Particularly useful are mineral fillers, such as talc, kaolin clay and pyrophylltie. The polyolefin resin and filler are milled together until the filler is thoroughly dispersed. Commonly present in the polyolefins are long-term stabilizers against degradation by oxygen, heat, and light and proecssing aids. The milling process of the filler and polyolefin causes shearing in the resin and an increase in temperature. The result is a tendency to cuase color deterioration of the polyolefin. The polyolefin composition shows a distnict hue, commonly called the "pinking effect". In some instances the pinking effect in filled polyolefins ins increased by the presence of epoxy-type additives and stabilizers of the phenol type. The normal amounts of commmon long-term stabilizers that protect the finished article during its life-time are ineffective to prevent the color deterioration cuased by the filler during the relatively short processing stage, when heat may be generated internally or applied externally. The addition of larger amounts of the stabilizer would be economically impractica and in some instances, detrimental to the overall properties of the product.

Therefore, it is desirable to add to filled polyolefin compositions, a particular stabilizer for reduction of color development, i.e., pinking effect caused by exposure to elevated temperatures during processing and aging.

It is known that talc has a degrading effct on the properties of polyolefins. U.S. Pat. No. 3,553,158 describes the degrading effect on talc on polyolefins and teaches the use of certain "talc deactivators". It further teaches that certain compounds, including zinc dibutylidthiocarbamate are not acceptable because they cause discoloration of talc filled polyolefins during processing or aging. The compoudn, however, are disclosed as long term stabilizers for polypropylene articles containing no fillers in U.K. Pat. No. 929,435.

Surprisingly, it has been discovered that a certin combination of zinc dibutylidthiocarbamate and zinc stearate affords the desired protection of rmineral filled polyolefins during processing and reduces pinking effect in the finished product.

SUMMARY OF THE INVENTION

The invention relates to polyolefin compositions filled with a silicate mineral filler and stabilized against color deterioration during processing which comprises a major portion of polyolefin, at least 10 percent by weight of mineral filler, and 0.03 to 1.0 percent by weight of a composition consisting of zinc dibutyldithiocarbamate and zinc stearate in the ratio of 1:4 to 4:1.

Another aspect of the invention concerns the color stabilization during processing, of compositions comprising polyolefins and a mineral filler by adding a stabilizer composition consisting of zinc dibutyldithiocarbamate and zinc stearate and mixing under shear conditions.

DETAILED DESCRIPTION OF THE INVENTION

The polyolefins that are generally formulated with mineral fillers are thermoplastic synthetic resins. They consist of monomeric 1-olefin units having 2 to 8 carbon atoms and higher. The monomeric units have 1-olefin unsaturation and can be staight chain or brached chain. Representative polyolefins include, among others, polyethylene, polypropylene, poly(6-methyl-1-heptene) and the like. Another group of polyolefins include copolymers of ethylene and propylene. Other compounds which are polymerized with ethylene or propylene include, among others, 1-butene, 1-pentene and similar units having 1-olefinic unsaturation. The polyolefins can be of low or high density. Such resins are well knwn and available commercially.

The mineral fillers which generally cause color deterioration during processing, namely the pinking effect, are silicate minerals. Particularly serious pinking effect is caused by talc, kaolin clay and pyrophyllite fillers. The degree of the pinking effect depends somewhat on the source of the crude ore and the properties of the mineral filler, as for example contaimination with other metal ions and paticle size. Minerals frm different depoists will contain varying amounts of different impurities in the form of metal ions. Some mineral refining processes will remove a significant portion of these impurities. The amount and type of impurity remaining in the filler is not critical to the invention.

The pinking caused by the silicate fillers is further enchanced by the presence of certain additives and antioxidants. Particularly detrimental are epoxy type mineral deactivators such as polyeposides derived from bispheonl A and epichlorohydrin or from diglycidyl ether of disphenol A and their esters with fatty acids, rosin acids and tall oils. Similarly, phenolic antioxidants ehnance the pinking effect in silicate filler polyolefins. The phenol stabilizer may contain one or more hydroxy groups. Representative phenol stabilizer include, among other, 2,6-t-butyl-p-cresol, 3,5-di- t-butyl-4-hydroxyhydrocinnamic acid triester of 1,3,5-tris(2-hydroxyethyl)-s-triazine-2,4,6-(1H,3H,5H)-trione, 2,2'-ethylidenebis(4,6-di-t-butylphenol), and tetrakis(methylene (3,5-di-t-butyl-4-hydroxyhydrocinnamage) methane. Particularly preferred is tri(3,5-di-t-butyl-4-hydroxygenzyl) isocyanurate.

In the instant polyolefin composition, the filler will be present from about 10 to 60 percent by weight and preferably 20 to 50 percent by weight based on the weight of the composition.

The present stabilizee composition consits of zinc dibutyldithiocarbamate and zinc stearate. Moreover, certain critical ratios of the two components produce a synergistic action towards inhibition of the pinking effect during processing. the synergistic composition contains zinc dibutyldithiocarbamate and zinc stearate in the ratio of 1:4 to 4:1 and preferably in the ratio of 1:3 to 3:1. A particularly preferred ratio of zinc stearate to zinc dibutylidthiocarbamate is 3:1.

The amount of stabilizer that is added to the polyolefin composition will depend somewhat on the amount and type of filler present. Generally, about 0.03 to 1.0 percent of the stabilizer is added to the polyolefin composition. The preferred range is 0.1 to 0.5 percent of the stabilizer composition based on the weight of the polyolefin composition.

The polyolefin composition may contain other conventional additives. Such additives include long term stabilizer against deterioration by light, heat or oxygen, processing aids, internal lubricants and the like.

Suitable stabilizers include, among others, phenols arlamines, organic phosphites, phosphates, thiophosphites, or thiophosphates of dialkyl hydroquinone. Common secondary antioxidants include thio esters as for example distearyl thiodipropionate and dilauryl thiodipropionate and dilauryl thiodipropionate. The composition may include impact modifiers as for example ethylene propylene diene monomers. In addition, other cnventional additives such as light stabilizers, plasticizers, internal lubricants, emulsifiers, antistatic agent, flameproffing agents, antimicrobial agents and pigments can be empolyed in compounding the filled polymers.

The polyolefin composition can be compounded in any suitable manner with conventional mixing eqipment such as a mill, Banbruy mixer or compounding extruder. Mixing is generally conducted under shear condtions at bout 160° C. to about 260° C. Shear is mesured as melt viscosity ranging from about 500 to 5000 meter-grams torque. Mixing is continued until a homogeneous composition is obtained. Thereafter, the polyolefin composition is formed into a desired shape and solidified at elevated temperatures. Typically the temperatures range from about 100° C. to 145° C. depending on the type of resin used.

The following examples are given for further illustration of the invention and are not intended in ay way to limit the invention. All percentages and parts are based on weight unles otherwise indicated.

EXAMPLE 1

Powdered polypropylene resin Profax ®6501 (Manufactured by Hmont Inc.) was dry-blended with a filler epoxy filler deactivator (epichlorohydrin-bisphenol A resin), a long term antioxidant tri(3,5-di-t-butyl-4-hydroxybenzyl) isocyanurate, a secondary antioxidant distearyl thiodipropionate and the stabilizer composition of the invention as given in Table I hereinbelow. Formulation 1 contained no stabilizer and served as control.

The dry blend was charged on a two-roll mill at 165° C. The compound was fluxed for approximately five minutes at which time it was sheeted off at 0.125 cm and allowed to cool. The milled sheet was compression molded at 182° C. for five minutes at 20,000 psi to a thickness of approximately 0.0625 cm. From this molded slab, 5×5 cm specimens were cut and placed on a glass plate for aging i an air circulating oven at 160° C.

The color of the specimens was determined by the L,a,b, 45°O° colorimetry according to the TAPPI Standard Method T524 cm-86. The ratings represent the following color characteristics.

L=degree of lightness, a=red (+a) to green (−a), and b=yellow +b) to blue (−b). ΔE is the change in color from the unages to the aged samples.

The test data compiled in Table I demonstrate that formulations 4,5 and 6 of the present invention provide good color degradation inhibition which is synergistic in nature. Formulations 2 and 3 containing the individual components of the present composition showed discolration.

TABLE I

| Color Characteristics After Aging at 160° C. | | | | | | |
|---|---|---|---|---|---|---|
| Formulation, in parts | 1 | 2 | 3 | 4 | 5 | 6 |
| Profax 6501 | 60.0 | 60.0 | 60.0 | 60.0 | 60.0 | 60.0 |
| Talc | 40.0 | 40.0 | 40.0 | 40.0 | 40.0 | 40.0 |
| Tris(3,5-di-t-butyl-4-hydroxybenzyl) isocyanurate | 0.075 | 0.075 | 0.075 | 0.075 | 0.075 | 0.075 |
| Distearyl thiodipropionate | 0.225 | 0.225 | 0.225 | 0.225 | 0.225 | 0.225 |
| Epoxy resin | 0.3 | 0.3 | 0.3 | 0.3 | 0.3 | 0.3 |
| Zinc stearate | — | — | 0.1 | 0.075 | 0.05 | 0.025 |
| Zinc dibutyl-dithio-carbamate | — | 0.1 | — | 0.025 | 0.05 | 0.075 |
| Color Characteristics | | | | | | |
| Brightness | | | | | | |
| Unaged | 52.6 | 54.6 | 50.7 | 53.9 | 57.0 | 54.4 |
| Aged 17 hours | 43.2 | 53.1 | 49.9 | 55.4 | 56.2 | 55.8 |
| Aged 37 hours | 41.0 | 50.0 | 47.7 | 54.5 | 52.0 | 53.8 |
| Aged 100 hours | 35.6 | 49.7 | 40.7 | 51.5 | 53.9 | 51.6 |
| L-Value | | | | | | |
| Unaged | 75.4 | 76.2 | 73.6 | 75.9 | 77.9 | 76.1 |
| Aged 17 hours | 71.9 | 78.2 | 75.5 | 78.2 | 79.1 | 79.1 |
| Aged 37 hours | 70.8 | 77.1 | 74.9 | 78.4 | 76.7 | 78.8 |
| Aged 100 hours | 67.5 | 77.8 | 70.7 | 77.0 | 79.9 | 78.5 |
| a-Value | | | | | | |
| Unaged | −0.6 | −0.9 | −0.8 | −0.9 | −0.6 | −0.9 |
| Aged 17 hours | +2.0 | −1.3 | +0.6 | −1.2 | −1.2 | −1.4 |
| Aged 37 hours | +2.4 | −1.4 | +1.1 | −1.0 | −1.3 | −1.4 |
| Aged 100 hours | +3.7 | −1.5 | +2.0 | −1.1 | −1.5 | −1.6 |
| b-Value | | | | | | |
| Unaged | +4.3 | +3.5 | +3.7 | +3.6 | +3.7 | +3.6 |
| Aged 17 hours | +8.6 | +7.6 | +7.1 | +5.4 | +6.2 | +6.5 |
| Aged 37 hours | +9.2 | +9.1 | +8.1 | +6.7 | +6.8 | +7.9 |
| Aged 100 hours | +10.6 | +10.3 | +9.5 | +7.5 | +9.5 | +9.5 |
| ΔE - Value | | | | | | |
| Aged 17 hours | 6.12 | 4.58 | 4.14 | 2.94 | 2.84 | 4.20 |
| Aged 37 hours | 7.36 | 5.69 | 4.97 | 3.98 | 3.40 | 5.10 |
| Aged 100 hours | 10.98 | 7.01 | 7.06 | 4.06 | 6.11 | 6.41 |

The above embodiments have shown various aspects of the present invention. Other variations will be evident to those skilled in the art and such modifications are intended to be within the scope of the invention as defined by the appended claims.

What is claimed is:

1. A composition having color stability during processing and comprising a mjaor amount of polyolefin, about 10 to 60 percent by weight of silicate mineral filler and 0.03 to 10 percent by weight of a color stabilizer composition consisting of zinc dibutyldithiocarbamate and zinc stearate in the ratio of 1:4 to 4:1.

2. The composition having color stability during processing of claim 1 which further contains a phenolci antioxidant.

3. The composition of claim 2 which contains a thio ester secondary antioxidant.

4. A composition hving color stability during processing and comprising a major amount of polypropylene, about 10 to 60 percent by weight of talc filler, 0.2 to 5.0 percent by weight of polyepoxide resin and 0.03 to 1.0 percent by weight of a color stabilizer composition consisting of zinc dibutyldithiocarbamate and zinc stearate in the ratio of 1:4 to 4:1.

5. A method of stabilizing against color deterioration during processing a polymer composition comprising a major amount of polyolefin and about 10 to 60 percent by weight of silicate mineral filler, which comprises incorporating into said composition prior to a mixing step under shear conditions, from 0.03 to 1.0 percent by weight of a color stabilizer composition consisting of zinc dibutyldithiocarbmate and zinc stearate in the ratio of 1:4 to 4:1, forming and solidifying the polymer composition.

6. A method according to claim 5 wherein the polymer composition fruther contains a phenolic antioxidant.

7. A method of stabilizing against color deterioration during processing a polymer composition comprising a major amount of polypropylene, about 10 to 60 percent by weight of talc filler and 0.2 to 5.0 percent by weight of polyepoxide resin, which comprises incorporating into said composition prior to a mixing step under shear conditions, from 0.03 to 1.0 percent by weight of a color stabilizer composition consisting of zinc dibutyldithiocarbamate and zinc stearate in the ratio of 1:3 to 3:1, forming and solidifying the polymer composition.

* * * * *

UNITED STATES PATENT AND TRADEMARK OFFICE
CERTIFICATE OF CORRECTION

PATENT NO. : 5,216,056

DATED : June 1, 1993

INVENTOR(S) : Richard A. Suhoza

It is certified that error appears in the above-identified patent and that said Letters Patent is hereby corrected as shown below:

In the Abstract [57]:
"dibutylidthiocarbamate" should be -- dibutyldithiocarbamate --;

Column 1, line 7
"compsoitions" should be -- compositions --;

Column 1, line 10
"of polyolefins" should be -- of polyolefin --;

Column 1, line 17
"pyrophylltie" should be -- pyrophyllite --;

Column 1, line 21
"proecssing aids" should be -- processing aids --;

Column 1, line 24
"cuase" should be -- cause --;

Column 1, line 25
"distnict" should be -- distinct --;

Column 1, line 27
"ins" should be -- is --;

Column 1, line 32
"cuased" should be -- caused --;

Column 1, line 35
"impractica" should be -- impractical --;

UNITED STATES PATENT AND TRADEMARK OFFICE
CERTIFICATE OF CORRECTION

PATENT NO. : 5,216,056
DATED : June 1, 1993
INVENTOR(S) : Richard A. Suhoza

It is certified that error appears in the above-identified patent and that said Letters Patent is hereby corrected as shown below:

Column 1, line 43
"effct" should be -- effect --;

Column 1, line 45
"on talc" should be -- of talc --;

Column 1, lines 47 and 54
"zinc dibutylidthiocarbamate" should be
-- zinc dibutyldithiocarbamate --;

Column 1, line 50
"compoudn" should be -- compounds --;

Column 1, line 53
"certin" should be -- certain --;

Column 1, line 55
"of rmineral" should be -- for mineral --;

Column 2, line 12
"brached" should be -- branched --;

Column 2, line 21
"knwn" should be -- known --;

Column 2, line 29
"contaimination" should be -- contamination --;

Column 2, lines 30-31
"paticle" should be -- particle -- and
"frm different depoists" should be
-- from different deposits --;

UNITED STATES PATENT AND TRADEMARK OFFICE
CERTIFICATE OF CORRECTION

PATENT NO.  : 5,216,056
DATED       : June 1, 1993
INVENTOR(S) : Richard A. Suhoza It is certified that error appears in the above-identified patent and that said Letters Patent is hereby corrected as shown below:

Column 2, line 39
"polyeposides" should be -- polyepoxides --;

Column 2, line 40
"bispheonl A" should be -- bisphenol A --;

Column 2, line 41
"disphenol A" should be -- bisphenol A --;

Column 2, line 43
"ehnance" should be -- enhance -- and
"silicate filler" should be -- silicate filled --;

Column 2, line 45
"stabilizer include, among other" should be
-- stabilizers include, among others --;

Column 2, line 50
"(3,5-di-t-butyl-4-hydroxyhydrocinnamage)" should be
-- (3,5-di-t-butyl-4-hydroxyhydrocinnamate) --;

Column 2, lines 51-52
"tri(3,5-di-t-butyl-4-hydroxygenzyl) isocyanurate."
should be -- tris(3,5-di-t-butyl-4-hydroxybenzyl) isocyanurate. --;

Column 2, line 57
"stabilizee" should be -- stabilizer --;

Column 2, line 61
"the synergistic" should be -- The synergistic --;

UNITED STATES PATENT AND TRADEMARK OFFICE
CERTIFICATE OF CORRECTION

PATENT NO. : 5,216,056

DATED : June 1, 1993

INVENTOR(S) : Richard A. Suhoza

It is certified that error appears in the above-identified patent and that said Letters Patent is hereby corrected as shown below:

Column 2, line 65
"zinc dibutylidthiocarbamate" should be
-- zinc dibutyldithiocarbamate --;

Column 3, line 7
"stabilizer" should be -- stabilizers --;

Column 3, lines 9-10
"phenols arlamines" should be -- phenols, arylamines --;

Column 3, lines 13-14
"and dilauryl thiodipropionate and dilauryl thiodipropionate."
should be -- and dilauryl thiodipropionate. --;

Column 3, line 17
"cnventional" should be -- conventional --;

Column 3, lines 18-19
"antistatic agent, flameproffing agents"
should be -- antistatic agents, flameproofing agents --;

Column 3, line 22
"eqipment" should be -- equipment --;

Column 3, line 23
"Banbruy" should be -- Banbury --;

Column 3, line 25
"condtions at bout" should be -- conditions at about --;

Column 3, line 26
"mesured" should be -- measured --;

UNITED STATES PATENT AND TRADEMARK OFFICE
CERTIFICATE OF CORRECTION

PATENT NO. : 5,216,056

DATED : June 1, 1993

INVENTOR(S) : Richard A. Suhoza

It is certified that error appears in the above-identified patent and that said Letters Patent is hereby corrected as shown below:

Column 3, line 34
"ay" should be -- any --;

Column 3, line 36
"unles" should be -- unless --;

Column 3, line 40
"Hmont" should be -- Himont --
and "a filler" should be -- a filler, --;

Column 3, lines 42-43
"tri(3,5-di-t-butyl-4-hydroxybenzyl) isocyanurate" should be
"tris(3,5-di-t-butyl-4-hydroxybenzyl) isocyanurate --;

Column 3, line 55
"i an" should be -- in an --;

Column 3, line 58
"T524 cm-86" should be -- T524 om-86 --;

Column 3, line 61
"yellow +b)" should be -- yellow (+b) --;

Column 3, line 62
"the unages" should be -- the unaged --;

Column 3, line 68
"discolration" should be -- discoloration --;

Column 4, line 45, Table 4, Formulation 5
"+9.5" should be -- +9.4 --;

UNITED STATES PATENT AND TRADEMARK OFFICE
CERTIFICATE OF CORRECTION

PATENT NO.   : 5,216,056
DATED        : June 1, 1993
INVENTOR(S)  : Richard A. Suhoza It is certified that error appears in the above-identified patent and that said Letters Patent is hereby corrected as shown below:

In the Claims:

Column 4, line 61
"mjaor" should be -- major --;

Column 4, line 63
"0.03 to 10" should be -- 0.03 to 1.0 --;

Column 4, line 67
"phenolci" should be -- phenolic --;

Column 5, line 3
"hving" should be -- having --;

Column 5, line 17
"zinc dibutyldithiocarbmate" should be
-- zinc dibutyldithiocarbamate --;

Column 6, line 4
"fruther" should be -- further --.

Signed and Sealed this

Twelfth Day of April, 1994

Attest:

BRUCE LEHMAN

*Attesting Officer*      *Commissioner of Patents and Trademarks*